United States Patent [19]

Bish et al.

[11] Patent Number: 4,764,182
[45] Date of Patent: Aug. 16, 1988

[54] ELECTRIC STORAGE BATTERY

[75] Inventors: James R. Bish, Anderson; Charles P. McCartney, Yorktown, both of Ind.

[73] Assignee: General Motors Corporation, Detroit, Mich.

[21] Appl. No.: 120,515

[22] Filed: Nov. 13, 1987

Related U.S. Application Data

[62] Division of Ser. No. 935,650, Dec. 3, 1986.

[51] Int. Cl.4 .......................................... H01M 2/00
[52] U.S. Cl. ...................................... 29/623.1; 29/730
[58] Field of Search ................ 429/623.1, 623.3, 730, 429/160; 264/271.1, 272.21

[56] References Cited

U.S. PATENT DOCUMENTS

| 755,142 | 3/1904 | Lake | 429/161 |
|---|---|---|---|
| 1,415,804 | 5/1922 | Crissey | 429/131 |
| 1,926,157 | 9/1933 | Lormor et al. | 429/161 |
| 2,287,802 | 6/1942 | Hill | 29/623.1 |
| 2,702,829 | 2/1955 | Chapel | 429/161 |
| 2,995,614 | 8/1961 | Krueger | 429/160 X |
| 3,080,445 | 3/1963 | Brown | 429/160 X |
| 3,350,237 | 10/1967 | Sealey | 29/623.4 |
| 3,396,056 | 8/1968 | Gonnard | 429/160 |
| 3,841,915 | 10/1974 | Eberle | 429/160 |
| 3,963,521 | 6/1976 | Jache | 429/160 |

Primary Examiner—Anthony Skapars
Attorney, Agent, or Firm—Lawrence B. Plant

[57] ABSTRACT

A galvanic cell stack including a plurality of alternately interleaved positive and negative polarity plates each including a conductive lug projecting therefrom for electrically coupling to other plates of like polarity in the cell stack. Each set of like polarity plate lugs includes a polymer strip pressure molded in situ about the roots of the lugs.

1 Claim, 2 Drawing Sheets

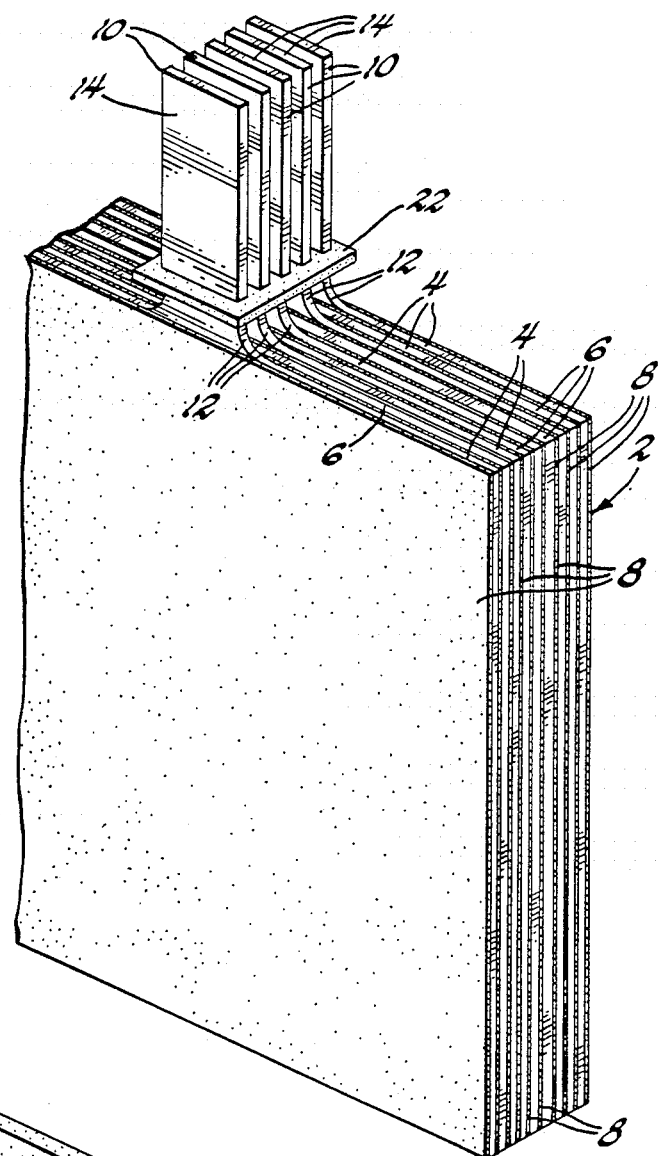
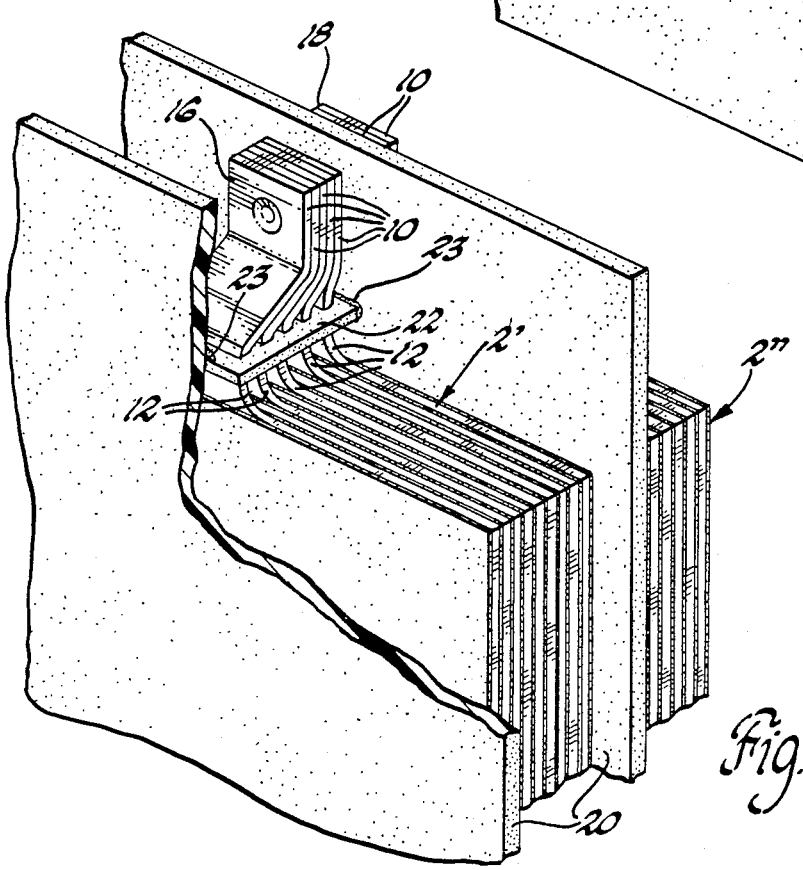
Fig.1
Fig.2

ELECTRIC STORAGE BATTERY

This is a division of application Ser. No. 935,650, filed on Dec. 3, 1986.

This invention relates to galvanic cells for electric storage batteries and more particularly to the electrochemically active cell elements therefore.

Electric storage batteries (e.g., lead-acid SLI batteries) comprise several galvanic cells each comprising an electrochemically active cell element immersed in electrolyte. Each cell element comprises a stack of alternating positive and negative polarity plates interleaved one with the other and separated one from the other by a thin microporous sheet known as a separator. In Pb-acid batteries, these plates comprise a leady active material (i.e., $PbO_2$ for the positive plates and Pb for the negative plates) pasted onto a reticulated alloy structure called a grid. The grid supports the active material relative to the other plates in the cell element and serves to conduct electrical current throughout the plate. The grids each have a lug projecting therefrom which serves as a means to couple the plate to other plates of like polarity within the cell element and ultimately to a cell element in the adjacent cell compartment of the battery container. In some instances, the plate lugs are simply bundled and welded together through an aperture in an internal wall of the container (e.g. see FIG. 5 of U.S. patent Matter No. 4,046,062). More typically, however, the several plate lugs are electrically joined one to the other by a bar of lead, known as a plate strap, which is burned to, or cast about, the plate lugs such as depicted in FIG. 2 of the aforesaid U.S. Pat. No. 4,046,062.

It has heretofore been proposed to position preformed ribbons of insulating material over the lugs of each set of aligned positive or negative plate lugs (e.g., see U.S. Pat. No. 2,287,802). The preformed ribbons include precut slots therein so located across the face of the ribbons as to register with the lugs at the time the ribbons is placed over the lugs. These ribbons have served to facilitate manufacturing (e.g., maintain alignment and spacing of the lugs), to rigidify the stack, and to prevent accidental internal short circuiting of the cell by keeping the plates of one polarity away from the plate strap of the opposite polarity plates as may occur, for example, where there is excessive positive plate growth in service. It has likewise been proposed to position a preformed preslotted trough over the plate lugs to form a mold for casting the plate strap onto the lugs during battery assembly (e.g., see U.S. Pat. No. 3,988,169).

Consistently positioning preslotted strip/trough preforms over a plurality of lugs using automated assembly equipment is extremely difficult to do at commercially acceptable production rates. In this regard, it is difficult for production equipment to consistently accurately register all the slots with the several lugs and then actually place the ribbon/trough over the lugs. Indeed, the slightest misalignment of even one of the lugs with respect to its corresponding slot will prevent proper placement of the ribbon/trough and result in an improperly assembled plate stack and ultimately a rejected battery. Accordingly, to insure an acceptable success rate in automatic placement of the ribbons/troughs onto the lug sets, the slots must be made longer and wider then the lugs with which they mate. Such oversized slots, however, result in a loose or sloppy fit of the ribbon/trough on the lugs which often defeats the intended purpose of the ribbon/trough. For example, a loose fitting ribbon cannot provide precise accurate alignment or spacing of the lugs which in turn can effect subsequent manufacturing operations. Moreover, loose fitting ribbons preclude the effective use thereof as a means for rigidifying or strenghtening the plate stack against damage during subsequent in-plant handling or in-service use of the battery. Finally, a loose fitting trough will not provide an adequate seal for containing molten lead cast about the lugs to form a plate strap when the trough is used as a plate strap mold ala the process of U.S. Pat. No. 3,988,169.

Hence, it is an object of the present invention to provide a galvanic cell element with a tight fitting ribbon of insulating material about the plate lugs. It is a further object of the present invention to provide a galvanic cell having such a ribbon anchored at its ends to the walls of the battery container to provide shock/vibration resistance to the cell element. It is a still further object of the present invention to provide a process for assembling battery plate stacks including pressure molding a ribbon of insulator material in situ in and about the roots of the battery plate lugs after the plates have been interleaved one with the other. These and other objects and advantages of the present invention will become more readily apparent from the detailed description thereof which follows.

BRIEF DESCRIPTION OF THE INVENTION

The present invention comprehends a ribbon of insulating material (e.g., thermoplastic or thermosetting resin) pressure molded (e.g., injection molded) in and about the roots of previously aligned positioned battery plate lugs such that the ribbon tightly engages and firmly holds the lugs in precise alignment with, and spaced from, each other. Molding the ribbon in situ about the lugs eliminates the need to attempt to automatically register a pre-slotted ribbon with a set of aligned plate lugs after the stack has been assembled. Processwise, the positive and negative polarity plates are first interleaved one with the other and with intervening separators in the conventional manner of assembling such battery plate stacks. Each plate has a lug projecting therefrom. Stacking of the plates is accomplished such that all the positive plate lugs and negative plate lugs are aligned as separate sets along the side of the stack. A comb-like positioning jig, or the like, interdigitates with the lugs of each positive and negative set of lugs and serves to precisely align and space them one from the other. With the lugs held firmly and accurately in place by the positioning jig, a mold is positioned between and about the roots of the lugs of each positive and negative polarity set and the insulating material injected into the mold under pressure. The injected insulating material fills the mold cavity and compressively engages the roots of the lugs. After cooling, the jig and mold are removed leaving the lugs firmly and immovably embedded within the plastic ribbon. The roots of the lugs will preferably have a notch formed therein to receive the molded resin and thereby more firmly secure the ribbon to the lugs. The thusly molded strip significantly rigidizes the ribbon against vibration or handling damage and may itself be secured to the walls of the cell compartment for firmly anchoring the cell stack in the compartment for even more damage resistance. Finally, the ribbon may be molded with upstanding flanges along the longitudinal edges thereof which flanges, acting in concert with theribbon itself, form a trough into which plate strap forming metal (e.g., lead) may be cast and shaped.

DETAILED DESCRIPTION OF A SPECIFIC EMBODIMENT

The present invention may better be understood when considered in the light of the following detailed description of certain specific embodiments thereof which are described hereafter in conjunction with the several drawings in which:

FIG. 1 is a perspective view of a stack of battery plates including a pressure molded ribbon made in accordance with the present invention;

FIG. 2 depicts the plate stack of FIG. 1 joined to a similar stack in an adjacent cell compartment of a battery container;

Figure 3:
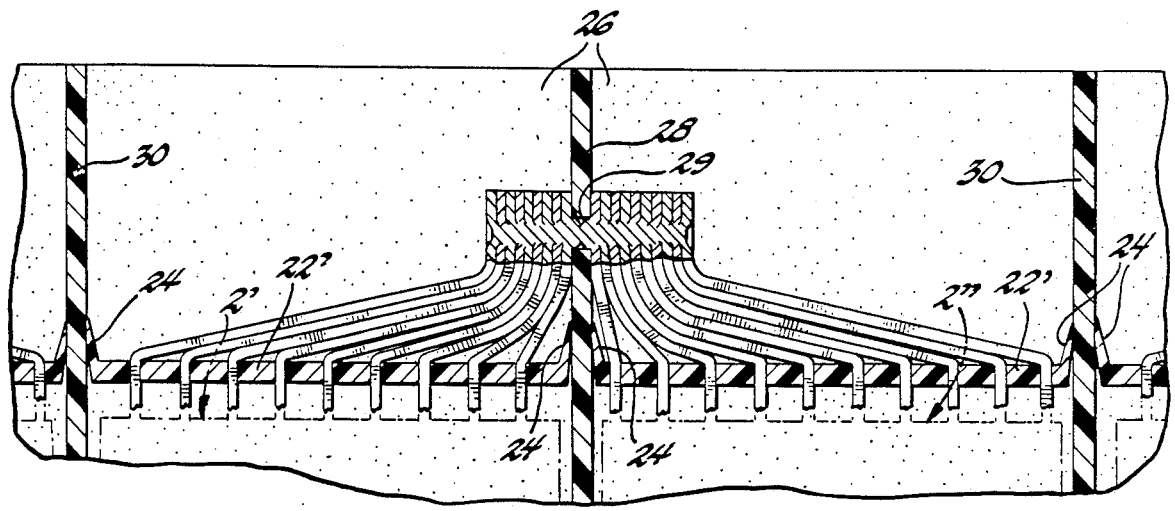
FIG. 3 is a side sectioned view through a battery like that depicted in FIG. 2.
Figure 7:
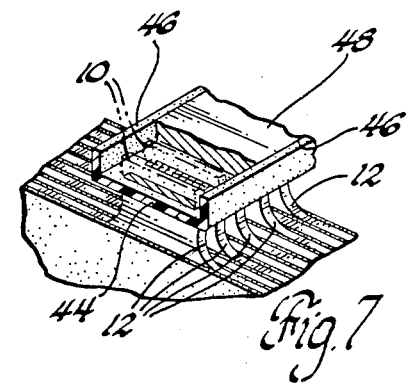
FIG. 7 is a perspective view of a portion of a battery plate stack depicting a trough molded in and about the roots of the battery plate lugs.

FIG. 1 depicts a stack 2 of positive battery plates 4 interleaved with a plurality of negative battery plates 6 and intervening microporous separator sheets 8. Each of the plates 4, 6 includes an integral lug 10 (only positive lugs shown) projecting therefrom and aligned with other similar plate lugs projecting from plates of like polarity. Each lug 10 includes a root portion 12 proximate its associated plate and a distal portion 14 more remote from the plate and serving to electrically connect its associated plate with other plates of like polarity via their respective lugs 10. FIGS. 2 and 3, for example, illustrate one such connection (i.e., bundled and welded lugs), while FIG. 7 illustrates another such connection (i.e., a plate strap cast/burned to the lugs). In accordance with the present invention, a ribbon of insulating material 22 is pressure molded directly to the roots 12 of the aligned lugs 10 as will be described in more detail hereafter.

Figure 5:
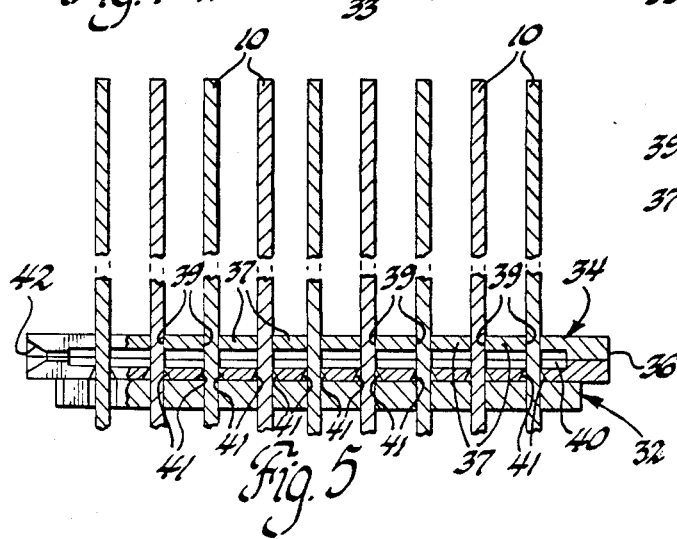
FIG. 5 is a side sectional view in the direction 5—5 of FIG. 4.

FIG. 2 depicts cell elements 2' and 2" in adjacent cell compartments of an electric storage battery and separated one from the other by the intercell partition 20. The positive lug set 16 of plates stack 2' is welded to the negative lug set 18 of the cell element 2" through an aperture in the partition 20 ala the method of Matter No. 4,046,062 (FIG. 5). In this design, the lugs 10 of each set are first bundled together adjacent the partition 20, as shown, before welding the bundles together through the aperture. In this particular design, the insulating ribbon 22 (which was previously molded about the roots 12 of the lugs 10) serves as a means for controlling the bending of the several lugs 10 toward the partition 20. More particularly, the integrally molded ribbon 22 insures that all the lugs of each are bent in precisely the same manner and are not bent at their roots in such a manner as to contact the next adjacent plate of opposite polarity and thereby result in a short circuit between those plates. Beads of glue 23, may be applied to both ends of the ribbon 22 to securely anchor it (and hence the cell elements 2, 2' or 2") to the partitions 20 for providing a significantly increased shock and vibration resistant battery.

FIG. 3 is a side sectional view of a portion of a battery whose intracell and intercell connections are made by welding the plate lugs together through the aperture 29 substantially as depicted in FIG. 2. In this embodiment, however, the insulator ribbon 22' includes tapered resilient lips 24 molded onto each end thereof. The resilient lips 24 deflect when the plate stacks are inserted into their respective cell compartments 26 and serve not only to center the stacks in the compartments during the assembly operation but also to tightly wedge the ribbon 22' in place between the partitions 28 and 30 defining the cell compartments 26 for firmly anchoring the stacks in the compartments without the need for glue or other fastening means.

Figure 4:
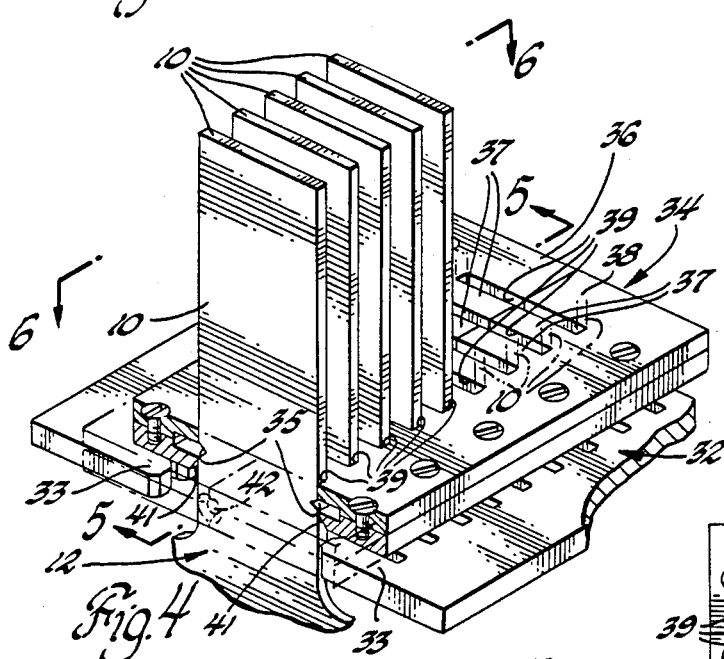
FIG. 4 is a perspective view depicting a mold positioned about a set of like-polarity battery plate lugs preparatory to pressure molding the ribbon of the present invention.

FIGS. 4 and 5 depict a method of assembling the plate stacks with the insulator ribbon of the present invention. In this regard, the several plates are first stacked together with their interplate separators in a conventional manner. Thereafter, the lugs 10 of each set are more precisely aligned, spaced one from the other and held in place by means of a jig 32 having comb-like jaws 33 which come together, interdigitate with the several lugs and hold them in place during placement of a mold 34 over the tops of the lugs 10. The two comb-like jaws 33 reciprocate relative to each other between an open lug-release position shown in FIG. 4 and a closed position for placement of the mold 34 over the lugs. The lugs 10 preferably include notches 35 on the edges thereof for receiving the pressure molded plastic therein for better anchorage of the ribbon 22 to the lugs.

Figure 6:
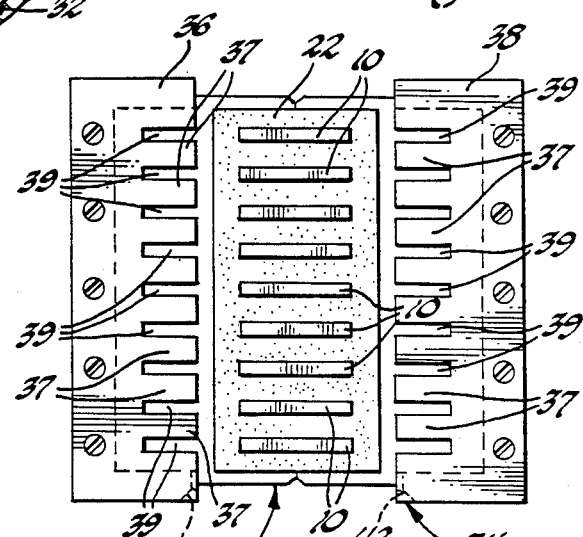
FIG. 6 is a plan view of the mold and lugs shown in FIG. 4 following molding and removal of the mold.

The mold 34 has two comb-like portions 36 and 38 which together define a mold cavity 40 for shaping the ribbon 22. The several fingers 37 of the mold portions 36 and 38 define slots 39 which closely receive the lugs 10 therein. The underside of the slots 39 are beveled 41 to facilitate placement of the mold 34 about the lugs 10 by guiding the tips thereof into the slots 39. After the mold 34 has been positioned about the roots 12 (i.e., at the notches 35 when used) of the lugs 10, liquid plastic is injected into the cavity 40 (see FIG. 5) through the opening 42 at one end of the mold 34. Virtually any thermoplastic or thermosetting resin may be used to form the ribbon 22. For SLI Pb-acid batteries, the same polypropylene material as is used to form the battery container is preferred for simplicity and economy reasons. However, in some applications, e.g. where the ribbon 22 will be exposed to high temperatures, a more temperature resistant plastic (e.g., polyphenylene sulfide such as Ryton) may be used. In other situations, thermosetting plastics will be the better choice. After the plastic has cooled and solidified, the mold 34 is removed by separating the mold halves 36 and 38 and as best shown in FIG. 6. The thusly molded ribbon 22 remains in place tightly engaging the lugs 10 in what amounts to essentially a shrink fit. As a result, the lugs 10 are now firmly anchored against even minor amounts of misalignment or movement relative to one another. The thusly established relationship between the lugs will remain constant throughout all further processing and in service use of the battery.

FIG. 7 depicts a somewhat different use for the pressure molded strip of the present invention. In this embodiment, the ribbon 44 includes upstanding flanges 46 extending along the longitudinal edges thereof. The flanges 46 and ribbon 44 together form a trough for receiving and shaping molten metal (e.g., lead) subsequently cast therein to form a plate strap 48 for the stack.

While the invention has been disclosed primarily in terms of specific embodiments thereof it is not intended to be limited thereto but rather only to the extent set forth hereafter in the claims which follow.

The embodiments of the invention in which an exclusive property or privilege is claimed are defined as follows:

1. In the method of assembling a cell element for an electric storage battery including the principal steps of alternately interleaving a plurality of lug-bearing positive and negative polarity plates one with the other such that the lugs of like polarity plates are aligned in sets along one side of the element the improvement comprising:

positioning a comb-like mold about the roots of the lugs of at least one of said sets proximate their associated plates, said mold having a plurality of fingers interdigitating with said lugs and defining a thin, narrow cavity about said roots for receiving and shaping a hardenable, fluid, insulating material;

injecting said material into said cavity;

allowing said injected material to harden into a ribbon of insulating material intimately engaging said roots; and thereafter, removing said mold;

whereby said ribbon firmly secures the aligned lugs of said one set together in fixed relation one to the other in said element and serves as a shield against electrical shorting between opposite polarity plates within the element in the region of the lugs.

* * * * *